United States Patent
Oono et al.

(10) Patent No.: US 9,923,207 B2
(45) Date of Patent: Mar. 20, 2018

(54) ELECTRODE MATERIAL, ELECTRODE AND LITHIUM ION BATTERY

(71) Applicant: SUMITOMO OSAKA CEMENT CO., LTD., Chiyo-da-ku, Tokyo (JP)

(72) Inventors: Koji Oono, Tokyo (JP); Takao Kitagawa, Tokyo (JP); Tatsuya Nakabeppu, Tokyo (JP); Kazuyo Yamamoto, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 184 days.

(21) Appl. No.: 14/220,533

(22) Filed: Mar. 20, 2014

(65) Prior Publication Data

US 2014/0287310 A1    Sep. 25, 2014

(30) Foreign Application Priority Data

Mar. 25, 2013   (JP) .................................. 2013-062076
Jan. 24, 2014   (JP) .................................. 2014-011680

(51) Int. Cl.
| | |
|---|---|
| *H01M 4/36* | (2006.01) |
| *H01M 4/04* | (2006.01) |
| *H01M 4/62* | (2006.01) |
| *H01M 4/131* | (2010.01) |
| *H01M 10/0525* | (2010.01) |

(52) U.S. Cl.
CPC ......... *H01M 4/625* (2013.01); *H01M 4/0471* (2013.01); *H01M 4/131* (2013.01); *H01M 4/366* (2013.01); *H01M 10/0525* (2013.01)

(58) Field of Classification Search
CPC ...... H01M 4/366; H01M 4/136; H01M 4/625; H01M 4/0471
See application file for complete search history.

(56) References Cited

U.S. PATENT DOCUMENTS

| | | | |
|---|---|---|---|
| 2012/0301780 A1* | 11/2012 | Kitagawa ............... | H01M 4/136 429/211 |
| 2013/0316233 A1* | 11/2013 | Hirayama ............... | H01M 4/02 429/211 |
| 2015/0037673 A1* | 2/2015 | Zaghib .................. | H01M 4/136 429/221 |

FOREIGN PATENT DOCUMENTS

| | | | | |
|---|---|---|---|---|
| JP | A-2009-117334 | 5/2009 | | |
| JP | A-2010-040357 | 2/2010 | | |
| JP | A-2012-054237 | 3/2012 | | |
| JP | A-2012-185979 | 9/2012 | | |
| WO | WO 2007-094240 A1 | 8/2007 | | |
| WO | WO 2012/005180 A1 | 1/2012 | | |
| WO | WO 2013049939 A1 * | 4/2013 | ............ | H01M 4/136 |
| WO | WO 2014-073652 A1 | 5/2014 | | |
| WO | WO 2012105637 A1 * | 7/2014 | ............. | H01M 4/02 |

OTHER PUBLICATIONS

WO 2012/005180 machine translation.*
Office Action for Japanese Patent Application No. 2014-011680 dated Sep. 30, 2014.

* cited by examiner

*Primary Examiner* — Basia A Ridley
*Assistant Examiner* — Heng M. Chan
(74) *Attorney, Agent, or Firm* — Merchant & Gould P.C.

(57) ABSTRACT

An electrode material which can improve the mobility of electrons and the mobility of ions at the same time, and, furthermore, does not have a problem of the impairment of the diffusion of lithium ions in a thin layer containing a carbonaceous electron-conductive substance so as to be excellent in terms of load characteristics and energy density, and an electrode and a lithium ion battery are provided. The electrode material of the invention is produced by forming a thin layer made of a carbonaceous electron-conductive substance on surfaces of primary particles made of an electrode active material, in which the carbonaceous electron-conductive substance contains nitrogen atoms.

7 Claims, No Drawings

ELECTRODE MATERIAL, ELECTRODE AND LITHIUM ION BATTERY

This application claims priority to Japanese Patent Application No. 2013-062076 filed 25 Mar. 2013 and Japanese Patent Application No. 2014-011680 filed 24 Jan. 2014, the disclosures of which are hereby incorporated by reference in their entireties.

BACKGROUND OF THE INVENTION

Field of the Invention

The present invention relates to an electrode material, an electrode, and a lithium ion battery, and particularly to an electrode material that is preferably used for positive electrode materials of lithium ion batteries for which a phosphate-based electrode active material having an olivine structure is used as an electrode active material and which is excellent in terms of charge characteristics, cycle characteristics and energy density, an electrode containing the above-described electrode material, and a lithium ion battery including a positive electrode made of the above-described electrode.

Description of Related Art

In recent years, non-aqueous electrolytic solution-based secondary batteries, such as lithium ion batteries, have been proposed and put into practical use as batteries having a small size, a light weight and a high capacity. The lithium ion battery is made up of a positive electrode, a negative electrode, both of which can reversibly insert and remove lithium ions, and a non-aqueous electrolyte.

Since lithium ion batteries have a light weight, a small size and a high energy compared with secondary batteries of the related art, such as lead batteries, nickel-cadmium batteries and nickel-hydrogen batteries, lithium ion batteries are used as a power supply for portable electronic devices such as mobile phones, notebook computers and portable information terminals; however, in recent years, have been studied as a high-output power supply for electric vehicles, hybrid vehicles, electric tools and the like. Electrode active materials used in batteries that are used as the high-output power supply are required to have high-speed charge and discharge characteristics.

In addition, studies are being made not only of the smoothing of the load of power generation but also of the applying of lithium ion batteries to large-sized batteries for a stationary power supply and a backup power supply, and the problemless resource amount as well as long-term stability and long-term reliability are emphasized.

Positive electrodes of lithium ion batteries are made of an electrode material containing a lithium-containing metal oxide that can reversibly insert and remove lithium ions, which is called a positive electrode active material, a conduction aid and a binder, and, when the electrode material is applied to the surface of a metallic foil called a collector, a positive electrode is produced. As the positive electrode active material for lithium ion batteries, lithium cobaltate ($LiCoO_2$) is generally used; however, additionally, lithium (Li) compounds such as lithium nickelate ($LiNiO_2$), lithium manganate ($LiMn_2O_4$) and lithium iron phosphate ($LiFePO_4$) are used. Among the above-described compounds, lithium cobaltate and lithium nickelate have problems of instability in the charged state as well as lacking in the amount of available resources. In addition, for lithium manganate, a problem of being dissolved in an electrolytic solution at a high temperature is pointed out.

Therefore, in recent years, phosphate-based electrode materials having an olivine structure represented by lithium iron phosphate are drawing attention as electrode materials that are excellent in terms of long-term stability and long-term reliability.

However, since the phosphate-based electrode materials have insufficient electron conductivity, as a method of improving the electron conductivity of the electrode materials, a method has been proposed in which an oxidant is added to a solution containing aniline and a raw material of an active material in an aqueous solvent so as to generate fine particles of the active material, and the aniline is polymerized on the surfaces of the fine particles of the active material (Japanese Laid-open Patent Publication No. 2010-40357).

However, in the above-described method, there was a problem in that aniline had a low solubility in the aqueous solvent such that it was difficult for aniline to be selectively attached to the electrode material when aniline was polymerized in the solution, furthermore, there was a case in which the solubility changed along with polymerization, and consequently, the thickness of a polyaniline-coated film on the surface of the electrode material became uneven or particles made only of polyaniline were formed, aniline did not effectively contribute to the improvement of the electron conductivity of the material, and performance became irregular.

As described above, since the phosphate-based electrode active materials have insufficient electron conductivity, in order to charge and discharge large currents, a variety of attempts such as the miniaturization of the particles and the formation of a complex with a conductive material are required, and a number of efforts have thus far been made.

However, the formation of a complex through the minimization of the particles or the addition of a large amount of a conductive material causes a decrease in electrode density such that a new problem of a decrease in the density of batteries, that is, a decrease in the capacity per unit volume is caused. Therefore, as a method of solving the above-described problem, a carbon coating method is proposed in which a solution of an organic substance is used as a carbon precursor which is an electron conductive substance (for example, refer to Japanese Laid-open Patent Publication No. 2012-185979).

The above-described method is a method in which a solution containing particles of an electrode active material and an organic substance, which is a carbon source, is dried, and then thermally treated in a non-oxidizing atmosphere, thereby forming a thin layer containing an organic substance-derived carbonaceous electron conductive substance on the surfaces of particles of an electrode active material.

In the above-described method, it is possible to apply a necessary minimum amount of an electron conductive substance to the surfaces of the particles of an electrode active material with an extremely high efficiency, and therefore it is possible to improve the conductivity without causing a significant decrease in the density of electrodes.

SUMMARY OF THE INVENTION

However, in the above-described method in which a solution containing particles of an electrode active material and an organic substance, which is a carbon source, is dried, and then thermally treated in a non-oxidizing atmosphere, generally, the carbonization temperature of the organic substance, which is the carbon source, is a high temperature, and, in order to ensure the electron conductivity of the thin layer obtained through the decomposition and carbonization of the organic substance, a thermal treatment at a high temperature that is above a certain level is required; however, in a case in which the solution is thermally treated at a high temperature, it is likely that grains of the electrode active material grow or the electrode active material is sintered. Therefore, it was necessary to pay close attention to the thermal treatment used to carbonize the organic substance.

In addition, in order to increase the electron conductivity of the thin layer obtained through the decomposition and carbonization of the organic substance, it was necessary to graphitize a carbonaceous electron-conductive substance contained in the thin layer, but there was a concern that grains of the electrode active material might grow or the electrode active material might be sintered during the graphitization as described above, and, at the same time, there was a concern that a new problem of the diffusion of lithium ions being impaired in the thin layer might be caused.

As described above, in a case in which the improvement of the performance of the electrode material, particularly, the improvement of the load characteristics is intended, it is necessary to improve the mobility of electrons and improve the mobility of ions at the same time; however, in this case, the impairment of the diffusion of lithium ions in the thin layer containing the carbonaceous electron-conductive substance becomes a vital problem.

The invention has been made to solve the above-described problems, and an object of the invention is to provide an electrode material which can improve the mobility of electrons and the mobility of ions at the same time, and, furthermore, does not have a problem of the impairment of the diffusion of lithium ions in a thin layer containing a carbonaceous electron-conductive substance so as to be excellent in terms of load characteristics and energy density, and an electrode and a lithium ion battery.

As a result of intensive studies to solve the above-described problems, the present inventors and the like found that, in an electrode material in which a thin layer made of a carbonaceous electron-conductive substance is formed on surfaces of primary particles made of an electrode active material, when nitrogen atoms are contained in the carbonaceous electron-conductive substance, it becomes possible to improve the conductivity of electrons and improve the diffusivity of lithium ions at the same time, and, furthermore, the diffusion of lithium ions in the thin layer containing the carbonaceous electron-conductive substance is not impaired so that, in a case in which the electron material is applied to lithium ion batteries, load characteristics, cycle characteristics and energy density are improved, and the invention is completed.

That is, according to an electrode material of the invention, there is provided an electrode material produced by forming a thin layer made of a carbonaceous electron-conductive substance on surfaces of primary particles made of an electrode active material, in which the carbonaceous electron-conductive substance contains nitrogen atoms.

In the electrode material of the invention, the content ratio of the nitrogen atoms in the carbonaceous electron-conductive substance is preferably in a range of 0.1% by mass to 20.0% by mass.

The electrode material is preferably formed by aggregating a plurality of the primary particles made of the electrode active material so as to produce secondary particles, and interposing a thin layer made of a carbonaceous electron-conductive substance between the primary particles.

The electrode material is preferably obtained by mixing an electrode active material, an organic substance which serves as a carbon source, a nitrogen source and a carbonization catalyst containing any one or both of Fe and Ni as necessary, and then thermally treating the mixture in a non-oxidizing atmosphere.

The electrode active material is preferably $Li_xA_yDO_4$ (here, A represents one or two or more elements selected from a group consisting of Mn, Fe, Co and Ni, D represents one or two or more elements selected from a group consisting of P, Si and S, $1 \leq x \leq 4$, $0 < y \leq 1.5$), the organic substance which serves as the carbon source preferably contains one or two or more elements selected from a group consisting of glucose, sucrose, polyvinyl alcohols, polyacrylic acids and hydroxylic acids, and the nitrogen source preferably contains one or two or more elements selected from a group consisting of pyridine, urea, thiourea and amines.

An electrode of the invention contains the electrode material of the invention.

A lithium ion battery of the invention includes a positive electrode made of the electrode of the invention.

According to the electrode material of the invention, since a thin layer made of a carbonaceous electron-conductive substance is formed on the surfaces of primary particles made of an electrode active material, and, furthermore, nitrogen atoms are contained in the carbonaceous electron-conductive substance, when the nitrogen atoms are introduced into the thin layer made of the carbonaceous electron-conductive substance, it is possible to allow a graphitized portion of a carbonaceous substance having excellent electron conductivity and an amorphous carbon portion having excellent diffusivity of lithium ions to coexist, and therefore it is possible to improve the conductivity of electrons and improve the diffusivity of lithium ions at the same time, and, furthermore, it is possible to remove the impairment of the diffusion of lithium ions in the thin layer containing the carbonaceous electron-conductive substance.

According to the electrode of the invention, since the electrode contains the electrode material of the invention, it is possible to improve the conductivity of electrons and improve the diffusivity of lithium ions at the same time, and, furthermore, it is possible to remove the impairment of the diffusion of lithium ions in the thin layer containing the carbonaceous electron-conductive substance. Therefore, it is possible to improve the load characteristics and energy density.

According to the lithium ion battery of the invention, since the lithium ion battery includes a positive electrode made of the electrode of the invention, it is possible to improve the load characteristics, the cycle characteristics and the energy density. Therefore, it is possible to provide a highly reliable lithium ion battery having durability, a high discharge capacity and sufficient charge and discharge rate performance.

DETAILED DESCRIPTION OF THE INVENTION

Embodiments for carrying out the electrode material, electrode and lithium ion battery of the invention will be described.

Meanwhile, the embodiments are to specifically describe the invention for better understanding of the purpose of the invention, and do not limit the invention unless otherwise particularly described.

[Electrode Material]

The electrode material of the embodiment is produced by forming a thin layer made of a carbonaceous electron-conductive substance on surfaces of primary particles made of an electrode active material, and the carbonaceous electron-conductive substance contains nitrogen atoms.

The electrode active material preferably has an olivine structure, and is preferably $Li_xA_yDO_4$ (here, A represents one or two or more elements selected from a group consisting of Mn, Fe, Co and Ni, D represents one or two or more elements selected from a group consisting of P, Si and S, $0 \le x \le 4$, $0 < y \le 1.5$).

When the electrode active material has the above-described composition, it is possible to expect a high voltage, high energy density, favorable load characteristics, and long-term stability.

In the electrode material of the embodiment, it is preferable to aggregate a plurality of the primary particles made of the electrode active material so as to produce secondary particles, and interpose a thin layer made of a carbonaceous electron-conductive substance between the primary particles.

Here, the secondary particles produced by aggregating a plurality of the primary particles made of the electrode active material refer to secondary particles in an aggregated state obtained by aggregating a plurality of the primary particles made of the electrode active material in a state in which a thin layer made of a carbonaceous electron-conductive substance is interposed between the primary particles. The state in which a plurality of the primary particles are aggregated is not particularly limited as long as the thin layer made of a carbonaceous electron-conductive substance is interposed between the primary particles, but the thin layer made of a neck-shaped carbonaceous electron-conductive substance having a small cross-sectional area is preferably interposed between the contact portions of the primary particles. As described above, when the thin layer made of a carbonaceous electron-conductive substance which is interposed between the primary particles has a neck shape with a small cross-sectional area, a structure in which channel-shaped (net-shaped) voids spread three-dimensionally in the secondary particles in an aggregated state is formed.

The state in which the thin layer made of a carbonaceous electron-conductive substance is interposed between the primary particles can be confirmed using a transmission electron microscope (TEM).

The content ratio of the carbonaceous electron-conductive substance is preferably in a range of 0.5% by mass to 10.0% by mass, and is more preferably in a range of 0.6% by mass to 7.0% by mass with respect to the mass of the electrode active material.

Here, the reason for limiting the content ratio of the carbonaceous electron-conductive substance with respect to the mass of the electrode active material in the above-described range is that, in the above-described range, it is possible to improve the conductivity of electrons and improve the diffusivity of lithium ions at the same time, and, furthermore, the direct current resistance (DCR) decreases.

Here, when the content ratio of the carbonaceous electron-conductive substance is less than 0.5% by mass with respect to the mass of the electrode active material, the content ratio of the carbonaceous electron-conductive substance in the secondary particles is too small, and the electron conductivity of the secondary particles decreases, which is not preferable. On the other hand, when the content ratio of the carbonaceous electron-conductive substance exceeds 10.0% by mass with respect to the mass of the electrode active material, the content ratio of the carbonaceous electron-conductive substance in the secondary particles is too large, the carbonaceous electron-conductive substance serves as a hindrance such that the diffusivity of lithium ions decreases, and consequently, the diffusion of lithium ions is significantly impaired, and it becomes impossible to satisfy the improvement of the conductivity of electrons and the improvement of the diffusivity of lithium ions at the same time, which is not preferable.

The thickness of the thin layer made of the carbonaceous electron-conductive substance is preferably in a range of 0.1 nm to 20.0 nm.

Here, when the thickness of the thin layer is less than 0.1 nm, the thickness of the thin layer made of the carbonaceous electron-conductive substance is too thin, and the electron conductivity of the carbonaceous electron-conductive substance decreases, which is not preferable. On the other hand, when the thickness of the thin layer exceeds 20.0 nm, the amount of the carbonaceous electron-conductive substance increases, and consequently, there is a concern that the battery activity, for example, the battery capacity per unit mass of the electrode material may decrease, which is not preferable.

Meanwhile, in order to increase the electron conductivity in the carbonaceous electron-conductive substance, carbonaceous particles may be added.

The carbonaceous electron-conductive substance is required to contain nitrogen atoms.

Here, the state in which the carbonaceous electron-conductive substance contains nitrogen atoms refers to a state in which nitrogen atoms are fixed in the carbonaceous electron-conductive substance by achieving one or two or more of (1) a state in which nitrogen atoms are present between the lattices of carbonaceous particles that configure the carbonaceous electron-conductive substance, (2) a state in which nitrogen atoms or nitrogen molecules are attached to carbonaceous particles that configure the carbonaceous electron-conductive substance, (3) a state in which a nitrogen compound is attached to carbonaceous particles that configure the carbonaceous electron-conductive substance, and (4) a state in which a nitrogen compound is chemically bonded to carbonaceous particles that configure the carbonaceous electron-conductive substance.

Here, as the example of the nitrogen compound that is attached or chemically bonded to carbonaceous particles that configure the carbonaceous electron-conductive substance include pyridine, urea, thiourea, amines and derivatives thereof are preferred.

The reason for containing nitrogen atoms to the carbonaceous electron-conductive substance is that it is possible to allow a graphitized portion of a carbonaceous substance having excellent electron conductivity and an amorphous carbon portion having excellent diffusivity of lithium ions to coexist by introducing nitrogen atoms into the thin layer made of the carbonaceous electron-conductive substance. When the carbonaceous electron-conductive substance has the above-described structure, it is possible to improve the conductivity of electrons and improve the conductivity of lithium ions at the same time, and, furthermore, it is possible to remove the impairment of the diffusion of lithium ions in the thin layer containing the carbonaceous electron-conductive substance.

The content ratio of nitrogen atoms in the carbonaceous electron-conductive substance can be calculated as a percentage of the total mass of nitrogen atom to the sum total of the total mass of nitrogen atoms and the total mass of carbon atoms in the carbonaceous electron-conductive substance. The content ratio of nitrogen atoms in the carbonaceous electron-conductive substance thus calculated is preferably in a range of 0.1% by mass to 20.0% by mass, more preferably in a range of 0.5% by mass to 20.0% by mass, and still more preferably in a range of 1.0% by mass to 20.0% by mass.

Here, the reason for limiting the content ratio of nitrogen atoms in the above-described range is that, in the above-described range, it is possible to allow a graphitized portion of a carbonaceous substance having excellent electron conductivity and an amorphous carbon portion having excellent diffusivity of lithium ions to coexist, and therefore it is possible to improve the conductivity of electrons and improve the conductivity of lithium ions at the same time, and, furthermore, the direct current resistance (DCR) decreases.

Here, when the content ratio of nitrogen atoms to the carbonaceous electron-conductive substance is less than 0.1% by mass, the content ratio of nitrogen atoms in the carbonaceous electron-conductive substance is too small, and the effect of the addition of nitrogen atoms to the carbonaceous electron-conductive substance becomes small, and therefore it becomes difficult to improve the conductivity of electrons and improve the conductivity of lithium ions at the same time, which is not preferable. On the other hand, when the content ratio of nitrogen atoms in the carbonaceous electron-conductive substance exceeds 20.0% by mass, the amount of nitrogen atoms which are non-conductive substances becomes too large, and it becomes difficult to improve the conductivity of electrons and improve the diffusivity of lithium ions at the same time, which is not preferable.

In the electrode material of the embodiment, a highly graphitized portion having excellent electron conductivity and an amorphous carbon portion having excellent ion diffusivity are allowed to coexist by interposing the thin layer made of the carbonaceous electron-conductive substance containing nitrogen atoms between $Li_xA_yDO_4$ particles which are the primary particles of the electrode active material with an olivine structure having a high capacity, high energy density, high stability and excellent cycle characteristics. Then, it becomes possible to allow favorable electron conductivity and favorable ion diffusivity to coexist.

[Method of Manufacturing the Electrode Material]

The electrode material of the embodiment can be obtained by mixing an electrode active material, an organic substance which serves as a carbon source, a nitrogen source and a carbonization catalyst containing any one or both of Fe and Ni as necessary, and then thermally treating the mixture in a non-oxidizing atmosphere.

Meanwhile, the electrode material of the embodiment can be produced using a solid-phase reaction method, a hydrothermal synthesis method or the like, and, when the electrode material is synthesized at a high pressure using the hydrothermal synthesis method, it is possible to obtain the target substance at a lower temperature than that of the solid-phase reaction method, and it is possible to obtain fine particles having excellent monodispersibility, which is preferable.

Next, the above-described manufacturing method will be described in detail.

First, an electrode active material, an organic substance which serves as the carbon source, a nitrogen source and a carbonization catalyst containing any one or both of Fe and Ni as necessary are dissolved or dispersed in a solvent, thereby producing a homogeneous slurry. During the dissolution or dispersion, a dispersant may be added.

The above-described electrode active material is preferably an electrode active material having the above-described olivine structure, and the electrode active material is preferably $Li_xA_yDO_4$ (here, A represents one or two or more elements selected from a group consisting of Mn, Fe, Co and Ni, D represents one or two or more elements selected from a group consisting of P, Si and S, $0 \leq x \leq 4$, $0 < y \leq 1.5$).

When the electrode active material has the above-described composition, it is possible to expect a high voltage, high energy density, favorable load characteristics, and long-term stability.

As the compound represented by $Li_xA_yDO_4$ ($Li_xA_yDO_4$ particles), it is possible to use particles manufactured by using a method of the related art such as a solid phase method, a liquid phase method or a gas phase method.

As the compound ($Li_xA_yDO_4$ particles), it is possible to preferably use a compound ($Li_xA_yDO_4$ particles) obtained by, for example, hydrothermally synthesizing a slurry-form mixture which is obtained by mixing a Li source selected from a group consisting of lithium salts such as lithium acetate ($LiCH_3COO$) and lithium chloride (LiCl) and lithium hydroxide (LiOH), a divalent iron salt such as iron chloride (II) ($FeCl_2$), iron acetate (II) ($Fe(CH_3COO)_2$) or iron sulfate (II) ($FeSO_4$), a phosphate compound such as phosphoric acid ($H_3PO_4$), ammonium dihydrogen phosphate ($NH_4H_2PO_4$) or diammonium hydrogen phosphate (($NH_4)_2HPO_4$), and water using a pressure-resistant closed container, washing the obtained sediment using water so as to generate a cake-form precursor substance, and firing the cake-form precursor substance.

The $Li_xA_yDO_4$ particles may be crystalline particles, amorphous particles, or mixed crystal particles in which crystalline particles and amorphous particles coexist. Here, the reason for the $Li_xA_yDO_4$ particles being amorphous particles is that, when the amorphous $Li_xA_yDO_4$ particles are thermally treated at a temperature in a range of 500° C. to 1000° C. in a non-oxidizing atmosphere, the $Li_xA_yDO_4$ particles crystallize.

The size of the electrode active material, that is, the $Li_xA_yDO_4$ particles (primary particles) is not particularly limited, but the average particle diameter is preferably in a range of 0.01 μm to 20 μm, and more preferably in a range of 0.02 μm to 5 μm.

Here, the reason for setting the size of the primary particles of the electrode active material in the above-described range is that, at an average particle diameter of the primary particles of less than 0.01 μm, when the surface of the electrode active material is coated with a carbonaceous thin layer, it becomes difficult to sufficiently coat the surface with a carbon thin film, the discharge capacity decreases during high-speed charge and discharge, and there is a concern that it may be not possible to realize sufficient charge and discharge performance, which is not preferable. On the other hand, when the average particle diameter of the primary particles exceeds 20 μm, the internal resistance of the primary particles increases, and the discharge capacity during high-speed charge and discharge becomes insufficient.

Meanwhile, the average particle diameter in the embodiment refers to the number-average particle diameter. The average particle diameter of the primary particles of the electrode active material can be measured using a laser diffraction and scattering-type particle size distribution measuring apparatus or the like.

The shape of the electrode active material is not particularly limited, but spherical particles have an excellent filling property and the like, and therefore the shape of the primary particles made of the electrode active material is preferably a spherical shape, particularly, a true spherical shape.

Another reason for the shape of the primary particles of the electrode active material being preferably a spherical shape, particularly, a true spherical shape, is that, when an electrode material obtained by aggregating a plurality of the primary particles made of the electrode active material so as to produce secondary particles and interposing a thin layer made of the carbonaceous electron-conductive substance containing nitrogen atoms between the primary particles, a binder resin (binder) and a solvent so as to prepare paste used to produce electrodes (positive electrodes), it is possible to decrease the amount of a solvent, and it becomes easy to apply the paste used to produce electrodes (positive electrodes) to collectors.

In addition, the organic substance which serves as the carbon source has a molecular weight of preferably 200,000 or less and more preferably 100,000 or less.

Here, when the molecular weight of the organic substance which serves as the carbon source exceeds 200,000, the solubility of the organic substance in water decreases, even when the organic substance is dissolved in water, the viscosity of the obtained solution becomes high, and there is a concern that a high viscosity may degrade workability, which is not preferable.

Examples of the organic substance include glucose, sucrose, polyvinyl alcohols, polyacrylic acids, hydroxylic acids, and the like. The organic substance may be solely used, or a mixture of two or more organic substances may be used.

In addition, the organic substance which serves as the nitrogen source is preferably an organic substance having a smaller molecular weight than the molecular weight of the organic substance which serves as the carbon source, and examples thereof include pyridine, urea, thiourea, amines and the like. The organic substance may be solely used, or a mixture of two or more organic substances may be used.

Particularly, when a crosslinkable and polyfunctional nitrogen-containing compound such as urea or a nitrogen-containing six-membered cyclic compound such as pyridine crosslinks the organic substance which serves as the carbon source or forms a carbon skeleton on its own, only a small amount of the organic substance which serves as the carbon source is burned, it is likely that carbon remains, and it is easy to introduce nitrogen atoms into the thin layer made of the carbonaceous electron-conductive substance, which is preferable.

Furthermore, the nitrogen source may be obtained by mixing a compound having an amino group or a nitro group with the organic substance or may be an inorganic compound such as nitrate or azide. Alternately, an organic substance containing nitrogen therein which serves as the carbon source such as pyridine may be used as the organic substance which serves as the carbon source.

The organic substance which serves as the carbon source and the organic substance which serves as the nitrogen source are combined so that the ratio of the number of nitrogen atoms in the organic substance which serves as the nitrogen source to the number of carbon atoms in the organic substance which serves as the carbon source (the number of nitrogen atoms/the number of carbon atoms) is in a range of 0.001 to 0.2.

Then, when the organic substance which serves as the carbon source is crosslinked, it is possible to increase the glass transition temperature and burn the organic substance, it is possible to suppress the movement of a thin layer made of the carbonaceous electron-conductive substance that is generated when the organic substance which serves as the carbon source is carbonized and decomposed, and therefore it is possible to obtain 80% or more of a coating rate of the surfaces of particles of the electrode active material.

Meanwhile, when the organic substance which serves as the carbon source is burned, it becomes necessary to use a large amount of the organic substance in order to ensure a predetermined amount of the thin layer made of the carbonaceous electron-conductive substance such that the manufacturing cost increases or a useless tar component is generated, and a load on the environment and damage on thermal treatment apparatuses are caused, which is not preferable.

Examples of the carbonization catalyst containing any one or both of Fe and Ni, which is added as necessary, include iron oxide, iron chloride, iron acetate, iron sulfate, iron nitrate, nickel oxide, nickel chloride, nickel acetate, nickel sulfate, nickel nitrate, and the like. The above-described carbonization catalyst may be solely used, or a mixture of two or more carbonization catalysts may be used, and, furthermore, other components that are different from what has been described may be mixed.

The solvent is preferably water; however, in addition to water, examples of the solvent include alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetylacetone and cyclohexanone; amides such as dimethyl formamide, N,N-dimethyl acetoacetamide and N-methyl pyrrolidone; glycols such as ethylene glycol, diethylene glycol and propylene glycol; and the like. The solvent may be solely used, or a mixture of two or more solvents may be used.

In a case in which water is used as the solvent, the solubility (content ratio) of the organic substance which serves as the carbon source and the organic substance which serves as the nitrogen source in water is preferably 6% by mass or more, and more preferably 10% by mass or more.

Here, when the solubility (content ratio) of the organic substance which serves as the carbon source and the organic substance which serves as the nitrogen source in water is less than 6% by mass, it becomes difficult to uniformly attach the thin layer made of the carbonaceous electron-conductive substance between the primary particles when a plurality of the primary particles made of the electrode active material are aggregated so as to produce secondary particles.

Here, the reason for using the organic substance which serves as the carbon source and the organic substance which serves as the nitrogen source at the same time is that, when the organic substance which serves as the carbon source and the organic substance which serves as the nitrogen source, both of which serve as raw materials of the thin layer made of the carbonaceous electron-conductive substance, are mixed, microscopic defects are introduced into the thin layer made of the carbonaceous electron-conductive substance that is generated by the carbonization and decomposition of the organic substance, and it becomes easily realizable to effectively generate both a highly graphitized carbon portion having high electron conductivity and an amorphous carbon portion having high ion diffusivity.

Next, the above-described slurry is sprayed and dried in a high-temperature atmosphere, for example, in the atmosphere at a temperature in a range of 70° C. to 250° C. using a spray-pyrolysis method.

In the spray-pyrolysis method, the particle diameter of liquid droplets is preferably set in a range of 0.05 µm to 500 µm during spraying to rapidly dry the slurry and produce a substantially spherical dried slurry.

Next, the dried slurry is polymerized with an organic substance in a non-oxidizing atmosphere at a temperature in a range of 70° C. to 350° C.

Next, the dried slurry polymerized with an organic substance is thermally treated in a non-oxidizing atmosphere, that is, an inert atmosphere or a reducing atmosphere at a temperature in a range of 400° C. to 1000° C. and preferably in a range of 550° C. to 850° C.

The inert atmosphere is preferably an atmosphere filled with an inert gas such as nitrogen ($N_2$) or argon (Ar), and, in a case in which it is necessary to further suppress oxidization, a reducing atmosphere containing a reducing gas such as hydrogen ($H_2$) is preferable.

Here, the reason for setting the thermal treatment temperature in a range of 400° C. to 1000° C. is that, when the thermal treatment temperature is lower than 400° C., the decomposition and reaction of the organic substance which serves as the carbon source and the organic substance which serves as the nitrogen source does not sufficiently proceed, and, in a case in which the organic substance which serves as the carbon source is insufficiently carbonized, a thin layer made of the carbonaceous electron-conductive substance having a high resistance is generated as a decomposition and reaction product, which is not preferable. On the other hand, when the thermal treatment temperature exceeds 1000° C., components of the $Li_xA_yDO_4$ particles that configure the electrode active material, for example, lithium (Li) is evaporated so as to deviate the composition, and grain growth in the $Li_xA_yDO_4$ particles is accelerated, the discharge capacity decreases at a high-speed charge and discharge rate, and it becomes difficult to realize sufficient charge and discharge rate performance, which is not preferable.

In addition, the thermal treatment time is not particularly limited as long as the organic substance which serves as the carbon source is sufficiently carbonized, and is set in a range of, for example, 0.5 hours to 48 hours.

The electrode material of the embodiment can be obtained as described above.

According to the method of manufacturing the electrode material, it is possible to easily realize carbonaceous conductive coating that is excellent in terms of both electron conductivity and ion diffusivity with low cost, a low environmental load and little apparatus damage. The present method can be applied regardless of the type of the electrode active material, and, as described above, the method is particularly effective for the conductive coating of olivine-type phosphate-based electrode materials having low cost, a low environmental load and low electron conductivity.

[Electrode]

An electrode according to the embodiment contains the electrode material of the embodiment.

In order to produce the electrode of the embodiment, the above-described electrode material, a binder made of a binder resin and a solvent are mixed so as to prepare paint used to form electrodes or paste used to form electrodes. At this time, a conduction aid such as carbon black may be added as necessary.

Examples of the binder, that is, the binder resin that can be preferably used include polytetrafluoroethylene (PTFE) resin, polyvinylidene fluoride (PVdF) resin, fluorine rubber and the like.

The blending ratio of the binder resin to the above-described electrode material is not particularly limited, and is set, for example, in a range of 1 part by mass to 30 parts by mass of the binder resin, and preferably in a range of 3 parts by mass to 20 parts by mass of the binder resin to 100 parts by mass of the electrode material.

The solvent used in the paint used to form electrodes or the paste used to form electrodes maybe appropriately selected depending on the properties of the binder resin, and examples thereof include water, alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetylacetone and cyclohexanone; amides such as dimethyl formamide, N,N-dimethyl acetoacetamide and N-methyl pyrrolidone; glycols such as ethylene glycol, diethylene glycol and propylene glycol; and the like. The solvent may be solely used, or a mixture of two or more solvents may be used.

Next, the paint used to form electrodes or the paste used to form electrodes is applied to one surface of a metallic foil, and then dried, thereby obtaining the metallic foil having a coated film made of a mixture of the above-described electrode material and the binder resin formed on one surface.

Next, the coated film is pressurized and dried, thereby producing an electrode having an electrode material layer on one surface of the metallic foil.

The electrode of the embodiment can be produced in the above manner.

In the electrode, it is possible to improve the electron conductivity of the electrode.

[Lithium Ion Battery]

A lithium ion battery of the embodiment includes a positive electrode made of the electrode of the embodiment, a negative electrode made of metallic Li, a Li alloy, $Li_4Ti_5O_{12}$, a carbon material and the like, an electrolytic solution, and a separator or a solid electrolyte.

When the electrode is produced using the electrode material of the embodiment, it is possible to improve the load characteristics, cycle characteristics and energy density of the lithium ion battery. Therefore, it is possible to provide a highly reliable lithium ion battery having durability, a high discharge capacity and sufficient charge and discharge rate performance.

As described above, according to the electrode material of the embodiment, since a plurality of the primary particles made of the electrode active material are aggregated so as to produce secondary particles, the thin layer made of the carbonaceous electron-conductive substance is interposed between the primary particles, and, furthermore, nitrogen atoms are contained in the carbonaceous electron-conductive substance, when the nitrogen atoms are introduced into the thin layer made of the carbonaceous electron-conductive substance, it is possible to allow a graphitized portion of a carbonaceous substance having excellent electron conductivity and an amorphous carbon portion having excellent diffusivity of lithium ions to coexist, and therefore it is possible to improve the conductivity of electrons and improve the diffusivity of lithium ions at the same time, and, furthermore, it is possible to remove the impairment of the diffusion of lithium ions in the thin layer containing the carbonaceous electron-conductive substance.

According to the method of manufacturing the electrode material of the embodiment, since the electrode active material, the organic substance which serves as the carbon source, the nitrogen source and the carbonization catalyst containing any one or both of Fe and Ni as necessary are mixed, and then are thermally treated in a non-oxidizing atmosphere, it is possible to easily manufacture an electrode material that can improve the conductivity of electrons and improve the diffusivity of lithium ions at the same time, and, furthermore, can remove the impairment of the diffusion of lithium ions in the thin layer containing the carbonaceous electron-conductive substance at low costs.

According to the electrode of the embodiment, since the electrode contains the electrode material of the embodiment, it is possible to improve the conductivity of electrons and improve the diffusivity of lithium ions at the same time, and, furthermore, it is possible to remove the impairment of the diffusion of lithium ions in the thin layer containing the carbonaceous electron-conductive substance. Therefore, it is possible to improve the load characteristics and energy density, and, furthermore, it is also possible to provide excellent cycle characteristics to the electrode.

According to the lithium ion battery of the embodiment, since the lithium ion battery includes the positive electrode made of the electrode of the embodiment, it is possible to improve the load characteristics, cycle characteristics and energy density. Therefore, it is possible to provide a highly reliable lithium ion battery having durability, a high discharge capacity and sufficient charge and discharge rate performance.

EXAMPLES

Hereinafter, the invention will be specifically described using Examples 1 to 7 and Comparative Examples 1 to 4, but the invention is not limited to the examples.

An electrode active material and a carbonization catalyst solution, which were used in both examples and comparative examples, were produced.

(Electrode Active Material)

(1) LCP 400 (manufactured by Sumitomo Osaka Cement Co., Ltd.) produced using a hydrothermal synthesis method was used as $LiFePO_4$.

(2) $LiMnPO_4$ was produced using a hydrothermal synthesis method.

First, lithium hydroxide (LiOH) was used as a Li source, phosphoric acid ($H_3PO_4$) was used as a P source, manganese sulfate pentahydrate ($MnSO_4 \cdot 5H_2O$) was used as a Mn source, the above components were injected into pure water, and mixed so as to obtain a molar ratio (Li:Mn:P) of 2:1:1, thereby producing 200 ml of a precursor slurry.

Next, the precursor slurry was put into a pressure-resistant container, and hydrothermally synthesized at 170° C. for 24 hours. After the reaction, the precursor slurry was naturally cooled so as to reach room temperature (25° C.), and a precipitated cake-form reaction product was obtained. The sediment was washed using distilled water 5 times, and the water content ratio was held at 30% to prevent the sediment from being dried, thereby producing a cake-form substance.

A small amount of measurement specimens were sampled from the cake-form substance, and dried in a vacuum at 70° C. for 2 hours. As a result of identifying the obtained powder through X-ray diffraction, it was confirmed that single-phase $LiMnPO_4$ was generated.

(Carbonization Catalyst Solution)

A carbonization catalyst solution used to coat a $LiMnPO_4$ active material which was a carbonization negative catalyst for organic substances was adjusted.

Here, 1 mole of lithium carbonate, 1 mole of iron (III) nitrate, and 1 mole of phosphoric acid were added to water respectively, adjusted so as to obtain a total amount of 1 kg, then, stirred and dissolved, thereby obtaining a carbonization catalyst solution.

The equivalent concentration of $LiFePO_4$ in the carbonization catalyst solution was 15.78% by mass, and the molar concentration was 1 mol/kg.

Example 1

20 g of $LiFePO_4$ and 1 g of the carbonization catalyst solution in terms of $LiFePO_4$ were mixed, then, 2.5 g of sucrose and 1.0 g of pyridine were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 1.

Example 2

19 g of $LiMnPO_4$ and 1 g of the carbonization catalyst solution in terms of $LiFePO_4$ were mixed, then, 2.5 g of sucrose and 1.0 g of thiourea were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 2.

Example 3

19 g of $LiMnPO_4$ and 1 g of the carbonization catalyst solution in terms of $LiFePO_4$ were mixed, then, 3.0 g of polyvinyl alcohol (PVA with a molecular weight of 50,000) and 1.0 g of urea were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 3.

Example 4

19 g of $LiMnPO_4$ and 1 g of the carbonization catalyst solution in terms of $LiFePO_4$ were mixed, then, 3.5 g of sucrose and 1.0 g of urea were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 4.

Example 5

20 g of $LiFePO_4$ and 1 g of the carbonization catalyst solution in terms of $LiFePO_4$ were mixed, then, 3.0 g of sucrose and 0.1 g of pyridine were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 5.

Example 6

20 g of $LiFePO_4$ and 1 g of the carbonization catalyst solution in terms of $LiFePO_4$ were mixed, then, 3.0 g of polyvinyl alcohol (PVA; molecular weight:50,000) and 1.0 g of urea were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 6.

Example 7

20 g of $LiFePO_4$ and 1 g of the carbonization catalyst solution in terms of $LiFePO_4$ were mixed, then, 3.0 g of polyvinyl alcohol (PVA; molecular weight:50,000) and 2.0 g of urea were added to the mixture, furthermore, water was added so as to adjust the total amount to 100 g, the mixture was crushed and mixed through ball milling together with 150 g of zirconia balls having a diameter of 5 mm, thereby obtaining a slurry.

The obtained slurry was dried using a spray dryer, granulated, and then thermally treated at 200° C. for 2 hours and then at 700° C. for 5 hours in a nitrogen ($N_2$) atmosphere, thereby obtaining an electrode material of Example 7.

Comparative Example 1

An electrode material of Comparative Example 1 was obtained based on Example 1 except for the fact that pyridine was not used and the amount of the sucrose was changed to 3.5 g from 2.5 g.

Comparative Example 2

An electrode material of Comparative Example 2 was obtained based on Example 2 except for the fact that thiourea was not used and the amount of the sucrose was changed to 3.5 g from 2.5 g.

Comparative Example 3

An electrode material of Comparative Example 3 was obtained based on Example 3 except for the fact that urea was not used and the amount of the polyvinyl alcohol (PVA) was changed to 4.0 g from 3.0 g.

Comparative Example 4

20 g of $LiFePO_4$ and 1 g of the carbonization catalyst solution in terms of $LiFePO_4$ were mixed, then, 4.5 g of aniline was added to the mixture, and, furthermore, water was added so as to adjust the total amount to 100 g, but some of the aniline was not dissolved but segregated, and the operation was stopped. Therefore, it was not possible to obtain an electrode material of Comparative Example 4.

[Determination of the Properties and Amounts of Carbon and Nitrogen in the Electrode Material]

The amounts of carbon and the amounts of nitrogen in the respective electrode materials obtained in Examples 1 to 7 and Comparative Examples 1 to 3 were measured using a carbon and sulfur analyzer (infrared absorption-type; manufactured by LECO Japan Corporation) and an oxygen and nitrogen analyzer (nitrogen: thermal conductivity detection-type; manufactured by LECO Japan Corporation). The measurement results are described in Table 1. In Table 1, "tr." indicates an extremely small amount(not higher than the sensitivity limit of nigrogen, 2 ppm).

In addition, for the respective electrode materials, the thin layers made of the carbonaceous electron-conductive substance were analyzed using a time of flight secondary ion mass spectrometer (TOF-SIMS).

Here, the count of ions having a mass number of 12 (corresponding to carbon ions), the count of ions having a mass number of 14 (corresponding to nitrogen ions), and the count of ions having a mass number of 26 (corresponding to carbon and nitrogen-bonding ions), all of which were detected using the time of flight secondary ion mass spectrometer (TOF-SIMS), were illustrated. In Table 1, "tr." indicates an extremely small amount(not higher than 5, corresponding to the background).

It is known that quantitative properties are not reflected in the ion count of the time of flight secondary ion mass spectrometer (TOF-SIMS). In all of the electrode materials of Examples 1 to 7, it was possible to confirm the presence of nitrogen using the oxygen and nitrogen analyzer and the presence of nitrogen ions and ions derived from the carbon-nitrogen bonding ions using the time of flight secondary ion mass spectrometer (TOF-SIMS). Then, it became clear that there was nitrogen bonded to carbon in the thin layer made of the carbonaceous electron-conductive substance.

[Production of Lithium Ion Batteries]

Lithium ion batteries of Examples 1 to 7 and Comparative Examples 1 to 3 were produced using the respective electrode materials obtained in Examples 1 to 7 and Comparative Examples 1 to 3.

First, the above-described electrode material, acetylene black (AB) as a conduction aid, and polyvinylidene fluoride (PVdF) as a binding material (binder) were mixed so as to obtain a mass ratio (the electrode material:AB:PVdF) of 90:5:5, and, furthermore, N-methyl-2-pyrrolidone (NMP) was added as a solvent so as to supply fluidity, thereby producing positive electrode material paste.

Next, the positive electrode material paste was applied to a 30 μm-thick aluminum (Al) foil, and dried. After that, the dried positive electrode paste and the aluminum foil were pressurized into a predetermined density, thereby producing an electrode plate.

Next, each of the obtained electrode plates was punched into a disc shape having a diameter of 16 mm, thereby producing a test electrode (positive electrode) for each of Examples 1 to 7 and Comparative Examples 1 to 3.

Lithium metal was disposed as a negative electrode against the positive electrode of the lithium ion battery, and a separator made of porous polypropylene was disposed between the positive electrode and the negative electrode, thereby producing a member used in.

In addition, 1 mol/L of a $LiPF_6$ solution was used as a non-aqueous electrolyte solution which was a non-aqueous electrolyte. Meanwhile, a mixture of ethylene carbonate and diethyl carbonate mixed in a volume ratio of 1:1 was used as a solvent used in the $LiPF_6$ solution.

In addition, lithium ion batteries of Examples 1 to 7 and Comparative Examples 1 to 3 were produced using the test electrodes (positive electrodes) produced in the above manner, the negative electrodes, the non-aqueous electrolyte solution, and 2016-type coin cells.

[Evaluation of the Lithium Ion Batteries]

0.1 C charging was carried out on the lithium ion batteries of Examples 1 to 7 and Comparative Examples 1 to 3 at an environmental temperature of 25° C. for 10 hours, was stopped for 10 minutes, and then a discharge capacity (mAh/g) was measured when 0.1 C discharging was carried out. Furthermore, as a second cycle, 0.1 C charging was carried out for 10 hours, was stopped for 10 minutes, and then a discharge capacity (mAh/g) was measured when 3 C discharging was carried out. The measurement results are described in Table 1.

[Table 1]

|  | nitrogen (mass %) | carbon (mass %) | nitrogen/ (nitrogen + carbon) (mass %) | TOF-SIMS (count number) | | | Discharge capacity (mAh/g) | |
|---|---|---|---|---|---|---|---|---|
|  |  |  |  | m = 12 | m = 14 | m = 26 | 0.1C | 3C |
| Example 1 | 0.14 | 2.20 | 5.98 | 18254 | 450 | 24212 | 161 | 149 |
| Example 2 | 0.15 | 2.60 | 5.45 | 20225 | 404 | 25205 | 148 | 129 |
| Example 3 | 0.49 | 2.40 | 16.96 | 21955 | 505 | 21955 | 148 | 132 |
| Example 4 | 0.51 | 2.90 | 14.96 | 20029 | 332 | 25491 | 151 | 136 |
| Example 5 | 0.01 | 2.64 | 0.38 | 22876 | 56 | 2656 | 162 | 138 |
| Example 6 | 0.47 | 2.30 | 16.97 | 19355 | 500 | 25672 | 160 | 151 |
| Example 7 | 0.95 | 2.49 | 27.62 | 21089 | 789 | 28768 | 159 | 143 |
| Comparative Example 1 | tr | 2.20 | — | 20228 | tr | tr | 155 | 102 |
| Comparative Example 2 | tr | 2.60 | — | 19856 | tr | tr | 129 | 89 |
| Comparative Example 3 | tr | 2.50 | — | 18025 | tr | tr | 129 | 90 |
| Comparative Example 4 | — | — | — | — | — | — | — | — |

According to the above-described results, in the battery materials of Examples 1 to 7, it was possible to confirm the presence of nitrogen using an oxygen and nitrogen analyzer and the presence of nitrogen ions and ions derived from carbon-nitrogen bonding ions using the time of flight secondary ion mass spectrometer (TOF-SIMS). Therefore, it became clear that there was nitrogen bonded to carbon in the thin layer made of the carbonaceous electron-conductive substance.

In addition, the lithium ion batteries for which the above-described electrode materials were used exhibited favorable load characteristics without impairing the diffusivity of lithium ions even in thermal treatment conditions in which electron conductivity could be sufficiently ensured.

On the other hand, in the battery materials of Comparative Examples 1 to 3, it was not possible to confirm the presence of nitrogen using an oxygen and nitrogen analyzer and the presence of nitrogen ions and ions derived from carbon-nitrogen bonding ions using the time of flight secondary ion mass spectrometer (TOF-SIMS). Therefore, it was considered that there was no nitrogen bonded to carbon in the thin layer made of the carbonaceous electron-conductive substance.

In addition, in the lithium ion batteries for which the above-described electrode materials were used, the diffusivity of lithium ions was impaired, and the load characteristics were degraded.

In the electrode material of the invention, since a plurality of the primary particles made of the electrode active material are aggregated so as to produce secondary particles, the thin layer made of the carbonaceous electron-conductive substance is interposed between the primary particles, and, furthermore, nitrogen atoms are contained in the carbonaceous electron-conductive substance, it is possible to improve the conductivity of electrons and improve the diffusivity of lithium ions at the same time, and, furthermore, it is possible to remove the impairment of the diffusion of lithium ions in the thin layer containing the carbonaceous electron-conductive substance, and therefore the electrode material can be applied to next-generation secondary batteries which are expected to decrease the size and weight and increase the capacity, and, in the case of next-generation secondary batteries, the above-described effects become extremely large.

What is claimed is:

1. An electrode material comprising:
primary particles consisting of an electrode active material and a thin layer of a carbonaceous electron-conductive substance on surfaces of the primary particles, wherein:
the thin layer has a thickness of 0.1 nm to 20.0 nm, and a coating rate of 80% or more of the surfaces of the primary particles;
the carbonaceous electron-conductive substance consists of nitrogen atoms in a range of 0.1% to 20.0% by mass based on a total mass of the carbonaceous electron-conductive substance, a graphitized portion of a carbonaceous substance, and an amorphous carbon portion;

the amount of nitrogen atoms is in a range of 0.0005% to 0.15% by mass based on a total mass of the electrode material;

the electrode active material is $Li_xA_yPO_4$, wherein A represents one or two or more elements selected from the group consisting of Mn, Fe, Co, and Ni; $0 \leq x \leq 4$; and $0 < y \leq 1.5$;

a content ratio of the carbonaceous electron-conductive substance is in a range of 0.5% by mass to 10.0% by mass with respect to the mass of the electrode active material; and the electrode material is for a positive electrode.

2. The electrode material according to claim 1, wherein a plurality of the primary particles made of the electrode active material is aggregated so as to form secondary particles with the thin layer made of a carbonaceous electron-conductive substance being interposed between the primary particles.

3. The electrode material according to claim 1, wherein the electrode material is obtained by mixing an electrode active material, an organic substance which serves as a carbon source, a nitrogen source and a carbonization catalyst containing any one or both of Fe and Ni as necessary, and then thermally treating the mixture in a non-oxidizing atmosphere.

4. The electrode material according to claim 3, wherein the organic substance which serves as the carbon source contains one or two or more elements selected from the group consisting of glucose, sucrose, polyvinyl alcohols, polyacrylic acids, and hydroxylic acids, and the nitrogen source contains one or two or more elements selected from the group consisting of pyridine, urea, thiourea, and amines.

5. The electrode material of claim 1, wherein the carbonaceous electron-conductive substance is formed by a carbonization process comprising mixing the electrode active material with a carbon source and a nitrogen source for the nitrogen atoms prior to carbonization, thereby producing the graphitized portion of the carbonaceous substance and the amorphous carbon portion.

6. An electrode comprising:
the electrode material according to claim 1.

7. A lithium ion battery comprising:
a positive electrode made of the electrode according to claim 6.

* * * * *